United States Patent [19]

Chen et al.

[11] Patent Number: 5,623,635

[45] Date of Patent: Apr. 22, 1997

[54] MEMORY CONSISTENT PRE-OWNERSHIP METHOD AND SYSTEM FOR TRANSFERRING DATA BETWEEN AND I/O DEVICE AND A MAIN MEMORY

[75] Inventors: Chang-Lun Chen, Hsinchu; Allen S. C. Wang; Wei-Wen Chang, both of Taipei, all of Taiwan

[73] Assignee: Industrial Technology Research Institute, Taiwan

[21] Appl. No.: 714,888

[22] Filed: Sep. 17, 1996

Related U.S. Application Data

[63] Continuation of Ser. No. 71,721, Jun. 4, 1993, abandoned.

[51] Int. Cl.⁶ .............................. G06F 12/14; G06F 13/20
[52] U.S. Cl. ......................... 395/479; 395/472; 395/471; 395/483
[58] Field of Search .................................. 395/479, 472, 395/471, 483, 875

[56] References Cited

U.S. PATENT DOCUMENTS

| | | | |
|---|---|---|---|
| 4,977,498 | 12/1990 | Rostegar et al. | 395/472 |
| 5,247,648 | 9/1993 | Watkins et al. | 395/470 |
| 5,511,226 | 4/1996 | Zika | 395/823 |

*Primary Examiner*—Eddie P. Chan
*Assistant Examiner*—Reginald G. Bragdon
*Attorney, Agent, or Firm*—Meltzer, Lippe, Goldstein, et al.

[57] ABSTRACT

A method and system is disclosed for efficiently transferring a sequence of data words from an I/O device to sequential addresses in a main memory via an I/O bridge. The sequence of data words to be transferred includes one or more subsequences of data words. Each subsequence of data words include only data words destined to addresses of the main memory in which data words of only one data line are stored. The I/O bridge has control logic for receiving a first subsequence of data words corresponding to a currently owned data line and for claiming ownership in one or more of the very next data lines corresponding to the next subsequences of data words to be transferred from the I/O device. The I/O bridge also has a buffer memory for storing a subsequence of the sequence of data words received from the I/O device. The control logic maintains in a pre-own tag array a list of the data lines in which ownership has been successfully claimed and a list in a buffer tag array of storage locations in the buffer memory allocated to receiving data words of particular subsequences of the sequence of data words from the I/O device.

17 Claims, 8 Drawing Sheets

|  |  | PRIOR ART | PRESENT INVENTION | GAIN |
|---|---|---|---|---|
| 10 CYCLES LATENCY | EISA BURST | 32BYTES/(10+32)*30ns =25.4MB/sec | 32BYTES/MAX(10, 32)*30ns =33.3MB/sec | 1.31 |
|  | 486 BURST | 32BYTES/(10+10)*30ns =53.3MB/sec | 32BYTES/MAX(10, 10)*30ns =106.6MB/sec | 2 |
|  | PCI BURST | 32BYTES/(10+8)*30ns =60MB/sec | 32BYTES/MAX(10, 8)*30ns =106.6MB/sec | 1.78 |
| 14 CYCLES LATENCY | EISA BURST | 32BYTES/(14+32)*30ns =23.2MB/sec | 32BYTES/MAX(14, 32)*30ns =33.3MB/sec | 1.44 |
|  | 486 BURST | 32BYTES/(14+10)*30ns =44.4MB/sec | 32BYTES/MAX(14, 10)*30ns =76.2MB/sec | 1.72 |
|  | PCI BURST | 32BYTES/(14+8)*30ns =48.5MB/sec | 32BYTES/MAX(14, 8)*30ns =76.2MB/sec | 1.57 |

MEMORY CONSISTENT PRE-OWNERSHIP METHOD AND SYSTEM FOR TRANSFERRING DATA BETWEEN AND I/O DEVICE AND A MAIN MEMORY

This is a continuation of application Ser. No. 08/071,721, filed Jun. 4, 1993, now abandoned.

FIELD OF THE INVENTION

The present invention relates to transferring data from one or more I/O devices to a main memory in a computer system that includes at least one high speed cache memory. In particular, the present invention is directed to an inventive I/O bridge connected to a main memory via a memory bus and to one or more I/O devices via an I/O bus. The inventive I/O bridge transfers data from the I/O devices to the main memory in an efficient manner which maintains the main memory consistency of the computer system.

BACKGROUND OF THE INVENTION

Figure 1:
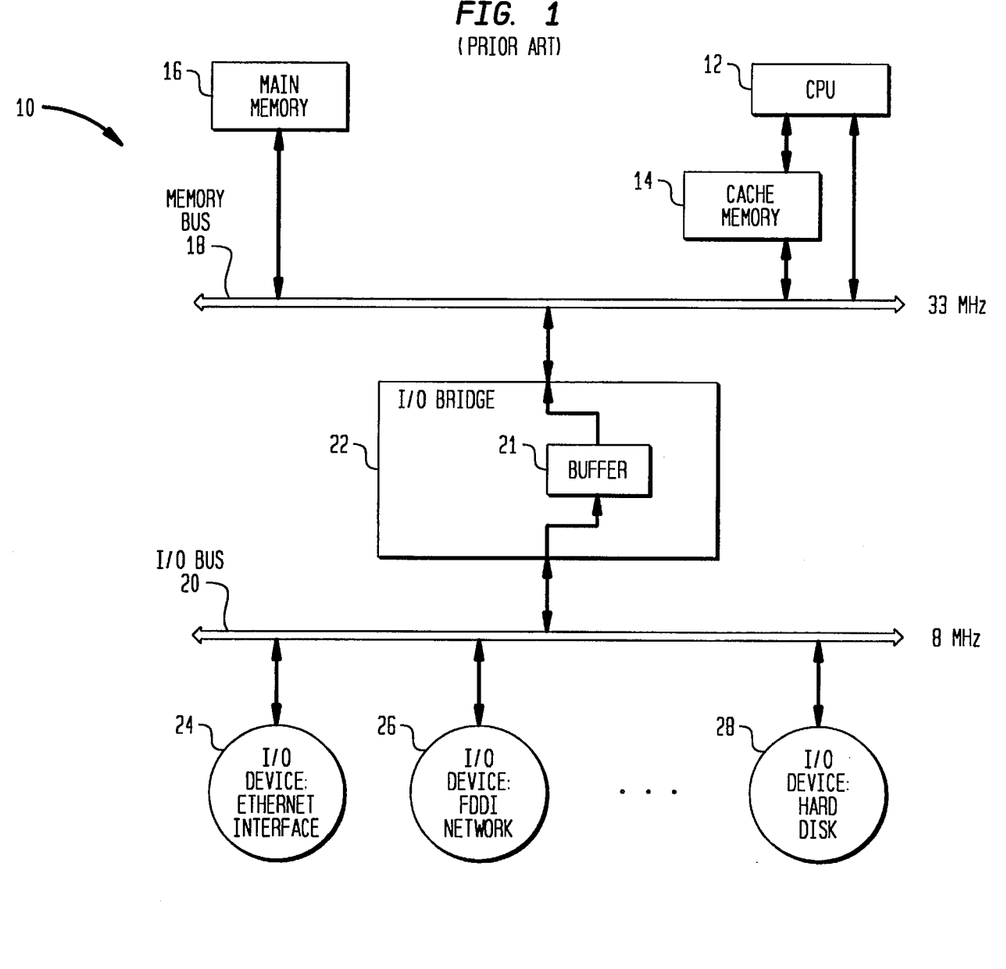
FIG. 1 depicts a prior art computer system.

A computer system 10 is depicted in FIG. 1. The computer system 10 includes a CPU or processor 12 and an associated cache memory 14, a main memory 16 and a memory bus 18. The function of each part is discussed in greater detail below.

The memory bus 18 is for transferring data and commands between different devices connected thereto, e.g., the CPU 12 or main memory 16. Illustratively, only one device may write data or commands via the memory bus 18 at one time. The computer system 10 has an elaborate bus arbitration protocol for providing each device an opportunity to write data or commands via the memory bus in the case that more than one device desires to write data or commands on the main memory bus 18 at the same time.

The CPU 12 executes instructions such as arithmetic or logical operations on data, program flow control instructions for ordering the execution of other instructions, and memory access commands. Memory access commands include commands for reading data and for writing data. For example, the CPU 12 can write data to the main memory 16 or cache memory 14 or read data from the main memory 16 or cache memory 14.

The main memory 16 is for storing data. The main memory 16 typically has a memory array of storage locations. Each storage location can store a data word of a fixed length, e.g., eight bit (or byte long) data words, therein for later retrieval. When the CPU 12 writes data to, or reads data from, the main memory 16, the CPU 12 issues a command via the memory bus 18 to access (i.e., write data in or read data from) a particular storage location in the memory array of the main memory 16. Each storage location has a unique address for referring to that particular storage location. Typically, the memory access commands include the address of the particular storage location in which data is to be written or from which data is to be read. In the case of a write, the CPU 12 also transfers the data to be stored in the main memory 16 via the memory bus 18. In the case of a read, the main memory 16 transfers the retrieved data to the CPU 12 via the memory bus 18.

The main memory 16 is typically formed by one or more dynamic random access memory integrated circuits (DRAMs). Such DRAM main memories 16 are relatively inexpensive.

On the other hand, a main memory 16 with DRAMs tends to be slow, utilizing at least approximately 80 nsec to store or retrieve data in a particular location of the memory array therein (i.e., data can be accessed at a 12.5 MHz rate). This is slower than the data transfer rate of the memory bus 18 (which can be 33 MHz) and much slower than the CPU 12 (which can have a 66 MHz clock). Thus, if the CPU 12 must access the main memory 16 periodically, e.g., to obtain program instructions, the CPU 12 will be idle for a substantial portion of the time while the CPU 12 waits to receive data from the main memory 16. This reduces the efficiency and operating speed of the computer 10.

Analysis of a large number of typical programs executed by the CPU 12 has shown that CPU accesses to the main memory 16 tend to be confined to a few localized areas of the main memory 16. This phenomenon is known as the property of locality of reference. The reason for this locality of reference property may be understood if one considers the program flow of a typical computer program. The CPU 12 typically executes a sequence of instructions stored in successively addressed memory locations until a subroutine or loop program flow control instruction is encountered. Such instructions cause the CPU 12 to repeat execution of specific sequences of instructions one or more times. Thus, loops and subroutines tend to localize the references or accesses to memory for fetching instructions.

In addition, memory references to non-instruction data tend to be localized to a lesser degree. Non-instruction data tends to be stored in tables, arrays and frequently accessed variables. Thus, the CPU 12, tends to access repeatedly the data stored in the same localities in memory.

If the most frequently accessed portions of program instruction and other data are placed in a small fast memory, the average access time for retrieving data will approach the speed of the small fast memory. This is because a large fraction of the requests will be for data stored in the small fast memory and only a smaller fraction of the memory access will be to the larger, slower main memory 16. The cache memory 14 is such a small, high speed memory.

Cache memories are typically formed by high speed static random access memory integrated circuits (SRAMs). The cache memory may also be part of the integrated circuit of the CPU 12. Cache memories 14 with SRAMs are relatively more expensive than the main memory 16 with DRAMs. Thus, it is not desirable to replace the entire main memory 16 with SRAMs. Rather, it is advantageous to supplement the main memory 16 with a relatively smaller cache memory 14 which operates as discussed below.

When the CPU 12 needs to read data from or write data to a particular addressed location of the main memory 16, the CPU 12 transmits a read or write command containing the address of the data in the main memory 16 to the cache memory 14. Upon receiving such a command, the cache memory 14 determines (as described in greater detail below) if the particular addressed data is stored therein. If so, a "read hit" or "write hit" is said to occur. The cache memory then simply retrieves the data and transfers it to the CPU 12 (in the case of a read) or stores the new data in an appropriate location in the cache memory 14 (in the case of a write).

If the cache memory 14 does not already contain the addressed data, a "read miss" or "write miss" is said to occur. In the case of a read or write miss, the cache memory issues a read command (including the particular address of the data) to the main memory 16 via the memory bus 18. In response to receiving the read command, the main memory 16 retrieves the data stored therein at the particular address and transfers this retrieved data via the memory bus 18 to the cache memory 14. The cache memory 14 stores the data transferred from the main memory 16 (as described below) and then continues as described above as if the data were already present in the cache memory 14.

It may be appreciated that the cache memory 14 merely stores a copy of the data in the main memory 16. However, the CPU 12 may repeatedly read or modify (i.e., over write) the copy of the data in the cache memory 14 at a much higher speed.

The cache memory 14 must operate in a manner that maintains the consistency of the data in the main memory 16. In other words, if data in the cache memory 14 is modified, its counterpart in the main memory 16 must also invariably be modified.

According to one manner of operating the cache memory 14 called "write through," the cache memory 14 issues a write command to the main memory 16 as soon as possible after the CPU 12 modifies the data in the cache memory 14. Thus, the data in the main memory 16 is contemporaneously updated with its copy in the cache memory 14.

According to another manner of operating the cache memory 14 called "write back," the cache memory 14 does not update the main memory 16 as soon as possible after the CPU 12 modifies the data in the cache memory 14. Rather, the cache memory 14 defers updating the counterpart data in the main memory 16 until a later time. For example, the cache memory 14 may defer updating the main memory 16 until the cache memory runs out of storage space. In such a case, a new datum must be stored in a location of the cache memory 14 currently occupied by an old datum. Before the cache memory 14 over writes the old datum, the cache memory 14 issues a command to the main memory 16 to update the counterpart of the old datum, but only if the old datum had been modified by the CPU 12 while residing in the cache memory 14.

Write back is generally more advantageous than write through. Typically, the CPU 12 modifies the data stored in a particular address several times. Write back defers updating the main memory 16 until the CPU 12 no longer needs the data or until absolutely necessary, thus avoiding many unnecessary updates to the main memory 16.

Figure 2:
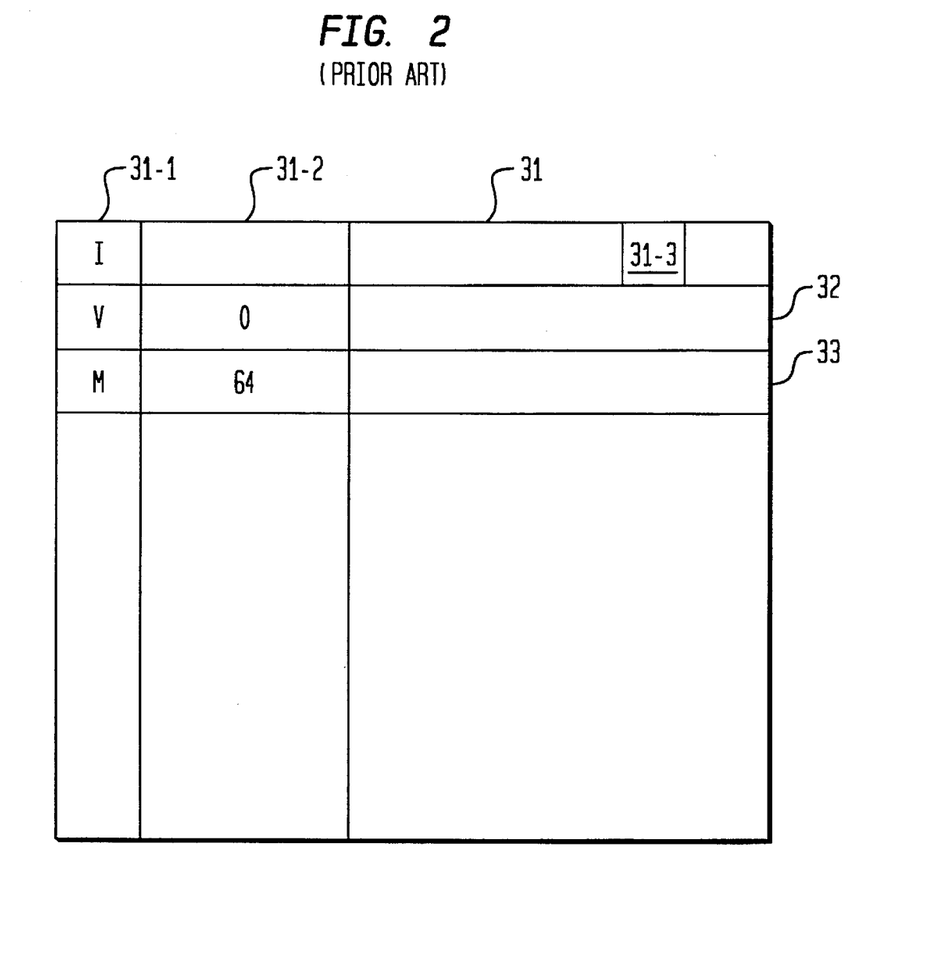
FIG. 2 illustrates the organization of a prior art cache memory.

One may appreciate from the above discussion that the cache memory 14 must keep track of which storage locations therein contain valid data, which contain invalid data (e.g., are empty) and which contain modified data that must be written back to the main memory 16. Furthermore, the cache memory 14 must keep track of the address in the main memory 16 of the counterpart data of each copy of data stored in the cache memory 14. Referring to FIG. 2, one organization of the cache memory 14 for achieving these ends is depicted.

As shown in FIG. 2, several consecutive data line storage locations 31, 32, and 33 of the cache memory 14 each store a line of data. A data line is a fixed length block or sequence of data words. Illustratively, the entire address space of the main memory is organized into contiguous, non-overlapping data lines such that a $p^{th}$ data line contains the data words residing in addresses p * data line length to (p+1) * data line length −1 of the main memory 16. For example, suppose each data line has a length of thirty-two bytes, and the storage locations 31, 32, and 33 store the $91^{st}$, $0^{th}$, and $1^{st}$ data lines, respectively. The data lines in storage locations 31, 32, and 33 contain copies of the bytes stored at the addresses 2912, 2913, . . . , 2943, copies of the bytes stored at the addresses 0, 1, . . . , 31, and copies of the bytes stored at addresses 32, 33, . . . , 63, respectively, in the main memory 16. The number p is also called the line address.

It is advantageous to transfer into the cache memory 14 the entire data line containing an accessed data word in the case of a read or write miss. This is because, by virtue of the locality of reference property, the CPU 12 is likely to access several data words in close proximity to one another, e.g., such as in the same data line. Thus, by moving the entire data line into the cache memory 14, the probability increases that data words subsequently accessed by the CPU 12 will already be in the cache memory 14.

Continuing with the above example, if each data line is thirty-two bytes long, then the cache memory 14 has a capacity for storing a certain number of data lines. For example, a 128K byte cache has a capacity for storing approximately 2–4K data lines which are thirty-two bytes long. As shown, associated with each data line, e.g., the data line stored at the location 31, is a tag field 31-1 for storing the status of the data line (e.g., valid, invalid, or modified), and a line address field 31-2 for storing the line address of the data line.

Initially, the tag field associated with each location in the cache memory stores an invalid status. When the CPU 12 issues a memory read or write command to the cache memory 14, the cache memory 14 compares the line address of the accessed data word to the line address of each data line stored in the cache memory 14 having a valid or modified status. If there are no matches, a read miss or a write miss occurs and the cache memory 14 retrieves the data line containing the accessed data word from the main memory 16 in the above described fashion. When this data line is transferred to the cache memory 14, it is stored in one of the data line storage locations (e.g., the storage location 31) of the cache memory 14. Preferably, the data word is stored in a data line storage location having an invalid status, if such a storage location is available. The line address of the retrieved data line is stored in the appropriate line address field (e.g., the line address field 31-2). In addition, the status stored in the tag field (e.g., the tag field 31-1) corresponding to the data line is changed from invalid to valid.

When the CPU 12 writes a data word to a particular addressed location, the data word received from the CPU 12 is stored in an appropriate location within the corresponding data line storage location in the cache memory 14. For example, suppose the storage location 31 stores the $91^{st}$ data line of bytes residing at the addresses 2912, 2913, . . . , 2943. If the CPU 12 writes a data word to the address 2914, this data word is stored in the third byte 31-3 of the storage location 31. In addition, the cache memory 14 changes the status stored in the tag field 31-1 from valid to modified. At a later time, the cache memory 14 may subsequently examine the tag field of a data line to determine if the data line was modified and therefore must be written back to the main memory 16.

In the computer system 10, more than one CPU 12 and cache memory 14 may also be connected to the memory bus 18 and have access to the main memory 16. This presents a problem for maintaining data consistency amongst all cache memories that may access a data line in the main memory 16. For instance, a first cache memory may retrieve a data line from the main memory 16 and modify it. Before the first cache memory writes this modified data line back to the main memory 16, a second cache memory may issue a command to retrieve the same data line from the main memory 16. The second cache memory must obtain the modified data line in the first cache memory and not the stale data line in the main memory 16.

In order to maintain the consistency of the data in the main memory 16 amongst all cache memories, the computer system 10 typically has an elaborate arbitration protocol for "claiming ownership" in data lines. A cache memory which successfully "claims ownership" in a data line has priority to modify the data therein. Otherwise, the cache memory is not permitted to modify a data line.

When a read or write miss occurs in a first cache memory, the first cache memory issues a command for claiming ownership in the data line in the main memory 16 via the memory bus 18. This command may be detected by a second cache memory. Typically, all cache memories which access the main memory 16 "snoop" or monitor the memory bus 18 for such commands issued by other cache memories. If the second cache memory currently stores the data line in which the first cache memory has claimed ownership, the second cache memory may do a number of things. If the status stored in the tag field associated with this data line is a valid status, the second cache memory may simply store an invalid status in the tag field of this data, thereby conceding ownership to the first cache memory. By marking the data line invalid, any subsequent access to this data line by the second cache memory results in a read or write miss. This causes the second cache memory to reclaim ownership of the data line thereby ensuring (as discussed below) that the data line incorporates any modifications made by the first cache memory and its associated CPU.

On the other hand, if the tag field associated with this data line stores a modified status, the second cache memory issues an intervention (delay) command to the first cache memory via the memory bus 18. The second cache memory then writes back the modified data line to the main memory 16 and changes the status stored in the tag field from modified to invalid. Thereafter, the first cache memory can retrieve the data line from the main memory 16. However, by virtue of these steps, the retrieved data line contains any modifications made by the second cache memory and associated CPU.

Cache memories 14 are not the only devices that access the main memory 16 in the computer system 10 of FIG. 1. As shown in FIG. 1, an I/O bridge 22 is provided connected to the memory bus 18. The I/O bridge 22 is also connected to an I/O bus 20. One or more I/O devices 24, 26 or 28 may also be connected to the I/O bus such as an Ethernet interface 24, a FDDI network interface 26 or a hard disk 28.

The purpose of the I/O bridge 22 is to "decouple" or isolate the I/O bus 20 and the memory bus 18 from each other. Typically, these buses have different data transmission protocols and speeds. For instance, data is illustratively transferred on the memory bus 18 in sixteen byte packets at a speed of 33 MHz. On the other hand, data is illustratively transferred on the I/O bus 20 in four byte groups at 8 MHz. The I/O bridge 22 is capable of both receiving and transmitting data in either manner. Thus, the main memory 16 can transfer data packets via the memory bus 18 to the I/O bridge 22. The I/O bridge 22 can thereafter transfer the "depacketized" data to the appropriate destination I/O device 24, 26, or 28 via the I/O bus 20. Likewise, an I/O device 24, 26, or 28 can transfer the data via the I/O bus 20 to the I/O bridge 22. The I/O bridge 22 thereafter transfers this data in packets to the main memory 16 via the memory bus 18.

The writing of data by an I/O device 24, 26, or 28 to the main memory 16 via the I/O bridge 22 must be performed in a fashion that maintains the consistency of the data in the main memory 16 and the cache memories 14. In a conventional computer system 10, this is achieved as follows. When an I/O device 24, 26, or 28 has data to write into a particular location or particular locations of the main memory 16, the I/O device 24, 26, or 28 issues a command to the I/O bridge 22. The I/O bridge 22 then attempts to claim ownership, as described above, in the data line having one or more data words stored at the same address or addresses to which the data of the I/O device 24, 26, or 28 is destined. For example, suppose the I/O device 24, 26 or 28 has a block of 256 bytes to be stored sequentially in the main memory 16 in the storage locations having the addresses 0–255. The I/O device 24, 26 or 28 issues a sequence of data transfer commands to the I/O bridge 22 indicating a desire to transfer data to the addresses 0–255. In response to receiving commands to transfer data to the addresses 0–31, the I/O bridge 22 attempts to claim ownership in the data line stored in the storage locations 0–31 (assuming each data line is thirty-two bytes long). If the I/O bridge 22 is successful in claiming ownership in this data line, the I/O device 24, 26, or 28 transfers the first thirty-two bytes of the 256 byte block to the buffer memory 21 of the I/O bridge 22 via the I/O bus 20. This data may thereafter be transferred from the I/O bridge 22 to the main memory 16 via the memory bus 18.

It is also possible, as discussed above, that a cache memory 14 has modified one of the data lines in which the I/O bridge 22 must claim ownership but has not yet written back the modified data line. In such a case, this cache memory 14 would then instruct the I/O bridge 22 to wait while it writes back the modified data line to the main memory 16.

The I/O device 22, 24 or 26 then issues commands to transfer data to the addresses 32–63. The above steps are then repeated for the data line having data words stored at addresses 32–63, etc. This process is repeated for each successive group of thirty-two bytes of the 256K bytes data block and the data lines residing in the storage locations to which that I/O device data is destined, i.e., residing at addresses 64–95, 96–127, 128–159, 160–191, 192–223 and 224–255.

In this process, the conventional I/O bridge 22 only claims ownership in a data line when the I/O device 24, 26 or 28 is about to transfer a data word destined to an address in which a data word of a data line not currently owned by the I/O bridge 22. That is, the I/O bridge 22 does not claim ownership in the data line stored at the addresses 32–63 until the I/O device 24, 26 or 28 is about to transfer the data word to be stored at the address 32.

This prior art method is disadvantageous. Before data can be transferred to the I/O bridge 22, the I/O bridge must successfully claim ownership in the data line having at least one data word stored at the same addresses in the main memory 16 to which the data of the I/O device 24, 26, or 28 is destined. As discussed above, in order to claim ownership in a data line successfully, the I/O bridge must issue an ownership claim command over the memory bus 18. The ownership claiming latency, which includes the command and bus arbitration latency, slows down the I/O device 24, 26, or 28 to main memory 16 write speed. I/O device 24, 26, or 28 to main memory 16 writes are further slowed down if the I/O bridge 22 must first wait for a cache memory 14 to write back any modifications of the data line in which the I/O bridge 22 has attempted to claim ownership.

It is therefore an object of the present invention to provide a system and method for efficiently transferring data from an I/O device to the main memory which overcomes the disadvantages of the prior art.

SUMMARY OF THE INVENTION

This and other objects are achieved according to the present invention which utilizes the strictly sequential, non-localized property of I/O device memory accesses. CPU accesses to data in the main memory tend to be localized to certain areas. However, it is difficult to predict exactly which areas will be accessed during a particular time period. An I/O device, on the other hand, accesses data sequentially and in a predictable way. For instance, an I/O device typically writes data sequentially in each successively increasing or successively decreasing storage location starting from a first storage location.

According to one embodiment of the invention, an I/O bridge is provided for transferring a sequence of data words from an I/O device to sequential addresses in a main memory which is organized into contiguous data lines. Each data line of the main memory is a fixed length block or sequence of data words stored at sequential addresses in the main memory. Thus, the sequence of data words to be transferred from the I/O device includes one or more contiguous subsequences of data words which subsequences are each destined to the main memory addresses at which the data words of only one data line are stored.

The I/O bridge has control logic for attempting to claim ownership in one or more of the aforementioned data lines corresponding to one or more subsequences of the sequence of data words to be transferred from the I/O device. In particular, while a subsequence of data words corresponding to a currently owned data line is transferred from the I/O device to the I/O bridge, the control logic claims ownership in one or more of the very next data lines immediately following or immediately preceding the currently owned data line.

The I/O bridge also has a buffer memory including a plurality of data line storage locations. Each data line storage location of the buffer memory can temporarily store one of the aforementioned subsequences of data words received from the I/O device.

The I/O bridge illustratively operates as follows. Suppose an I/O device indicates to the I/O bridge that the I/O device has a block (i.e., a sequence) of data words to transfer to particular sequentially addressed locations of the main memory. Illustratively, the I/O device achieves this by generating a sequence of data transfer commands which contain the main memory destination addresses to which the data words are to be transferred. In response to the request by the I/O device, the control logic first determines the initial address in the main memory to which the sequence of data words is destined (by, for example, examining the destination address contained in the first data transfer command generated by the I/O device). Then, the control logic attempts to claim ownership in the data line that includes a data word stored at this initial destination address. Once the control logic has successfully claimed ownership in this data line, the control logic causes the I/O bridge to receive the first subsequence of data words destined to the main memory addresses at which the data words of this data line are stored.

As the data of the first subsequence of data words is received from the I/O device, the control logic examines the destination addresses of the data words (which may illustratively be contained within data transfer commands issued by the I/O device). Based on this examination, the I/O device determines whether consecutive data words are destined to sequentially increasing or sequentially decreasing destination addresses from the initial destination address. The control logic can therefore determine whether the next subsequences of data words to be received from the I/O device after the currently received subsequence correspond to data lines which immediately precede (in the case of decreasing destination addresses) or immediately follow (in the case of increasing destination addresses) the currently owned data line. Thus the control logic can attempt to claim ownership in one or more of the very next data lines for the next subsequences of data words to be received from the I/O device while data corresponding to the currently owned data line is received.

The net result is that any ownership claiming latency, e.g., command and bus arbitration latency, or latency due to a cache memory writing back a data line, for the next data line is incurred while data of the current data line is received. Stated another way, because ownership is preliminarily claimed for a next data line while data corresponding to a current data line is received, little or no delay is incurred between receiving each subsequence of data words from the I/O device.

The I/O bridge illustratively has an array of pre-own tag array elements. Each pre-own tag array element is capable of storing a line address of the main memory and a pre-own or invalid status indication. As ownership is successfully claimed in each data line, the control logic stores the corresponding line address of each owned data line in a separate pre-own tag array element. The control logic also stores a pre-own status indication in each of these pre-own tag array elements. However, it is possible that a cache memory may attempt to claim ownership in one of these data lines after the control logic has successfully claimed ownership therein. Thus, the control logic snoops the memory bus. In response to such a claim by a cache memory, the control logic changes the status in the pre-own tag array back to invalid and reattempts to claim ownership in this data line.

The control logic transfers each subsequence of the sequence of data words received from the I/O device into a corresponding data line storage location of the buffer memory in parallel with issuing claiming commands. However, the control logic only transfers in a subsequence of data words from the I/O device if the control logic has successfully claimed ownership in the corresponding data line having data words stored at the destination addresses of the subsequence of data words. In other words, the control logic first determines if the pre-own tag array stores the line address of a data line having a pre-owned status which data line includes data words stored in the main memory at each address to which each data word of the subsequence of data words is destined. If so, the data may be transferred into the buffer memory from the I/O device.

Illustratively, the I/O bridge also has an array of buffer tag array elements which each correspond to one data line storage location in the buffer memory. Each buffer tag array element can store a line address of a data line and a modified or invalid status indication.

If an appropriate data line is pre-owned, the control logic allocates a data line storage location in the buffer memory for temporarily receiving the corresponding subsequence of data words from the I/O device. Upon receiving the first data word of the subsequence, the control logic stores the line address of the pre-owned data line in a buffer tag array element corresponding to this data line storage location. The control logic then stores the subsequence of data words received from the I/O device in its appropriate location within the data line storage location in the buffer memory. The control logic furthermore changes the state in the buffer tag array element corresponding to this data line storage location from invalid to modified.

The control logic can transfer data from the buffer memory to the main memory, for example, after the I/O device transfers the last data word of a subsequence to the data line storage location. After the control logic transfers out the last data word stored in the data line storage location of the buffer memory to the main memory, the control logic also changes the status of the corresponding buffer tag array entry to invalid.

In short, the present invention utilizes the sequential, non-localized property of I/O device to main memory writes to predict in which data lines ownership must be claimed. Thus, while receiving data corresponding to a currently owned data line, the I/O bridge can attempt to claim ownership in one or more data lines immediately following or immediately preceding the currently owned data line. As a result, ownership claiming latency is reduced.

DETAILED DESCRIPTION OF THE INVENTION

Figure 3:
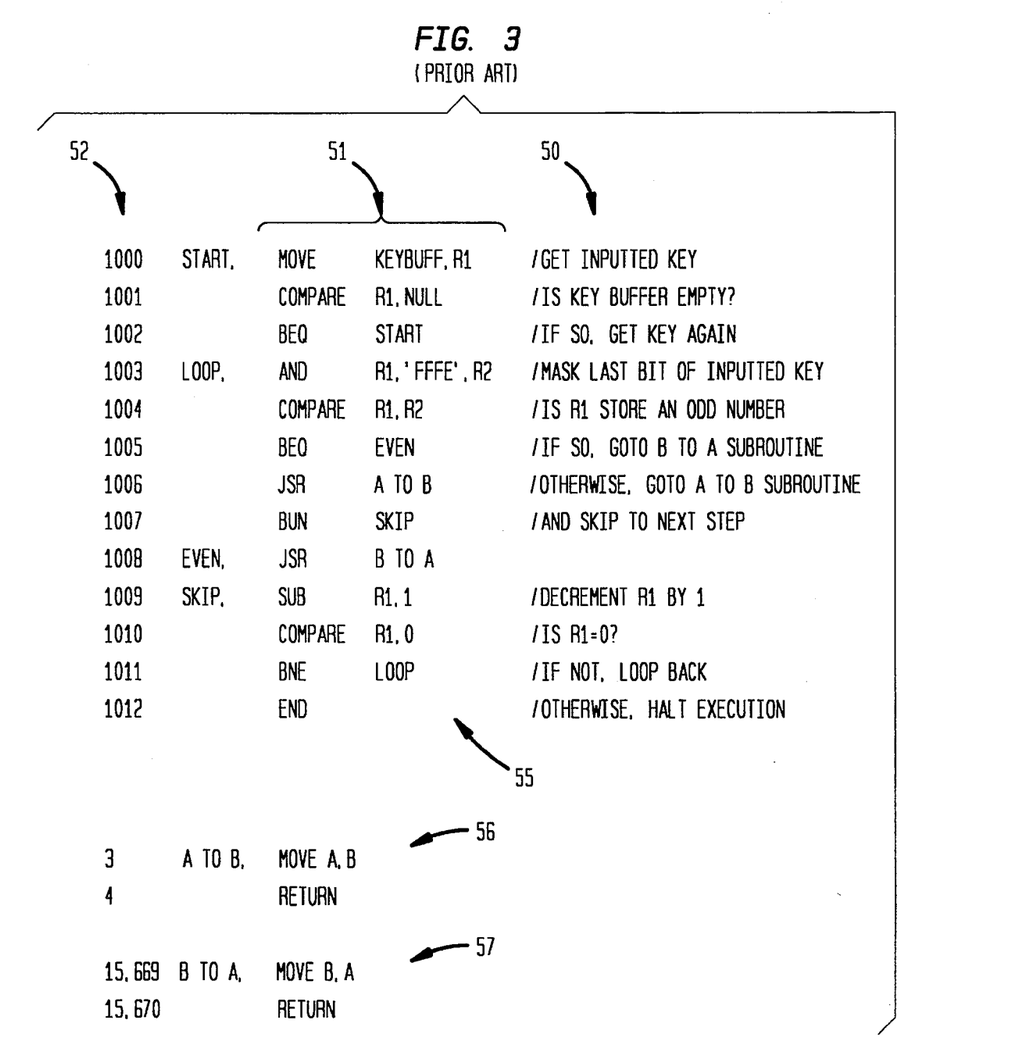
FIG. 3 illustrates an exemplary computer program.

In order to achieve a better understanding of the invention, it is useful to review the differences between CPU memory accesses and I/O device accesses. FIG. 3 depicts an exemplary computer program 50 which may be executed by a CPU. The program 50 has instructions 51 which may be stored in the main memory at the indicated addressed locations 52. In addition, several variables, e.g., A and B, may also be stored at particular addressed locations in the main memory.

To execute an instruction, the CPU must first read in the instruction from its address in a main memory or cache memory. Similarly, to execute an operation on a variable, the CPU must read in the data of the variable from its address.

The program 50 has three parts, a main routine 55 and two subroutines 56 and 57. As shown, the main routine 55 repeatedly executes the instructions stored at addresses 1003–1011 a number of times depending on a value inputted from a keyboard. Furthermore, the subroutines 56 and 57 may be each executed zero or more times depending on this inputted value. The inputted value therefore controls the number of times the two variables A and B will be accessed. However, this inputted value cannot be predicted by the CPU. Thus, the CPU tends to repeatedly access the same localized addressed locations in the main memory although it is difficult to exactly predict which addressed localities will be accessed.

Figure 4:
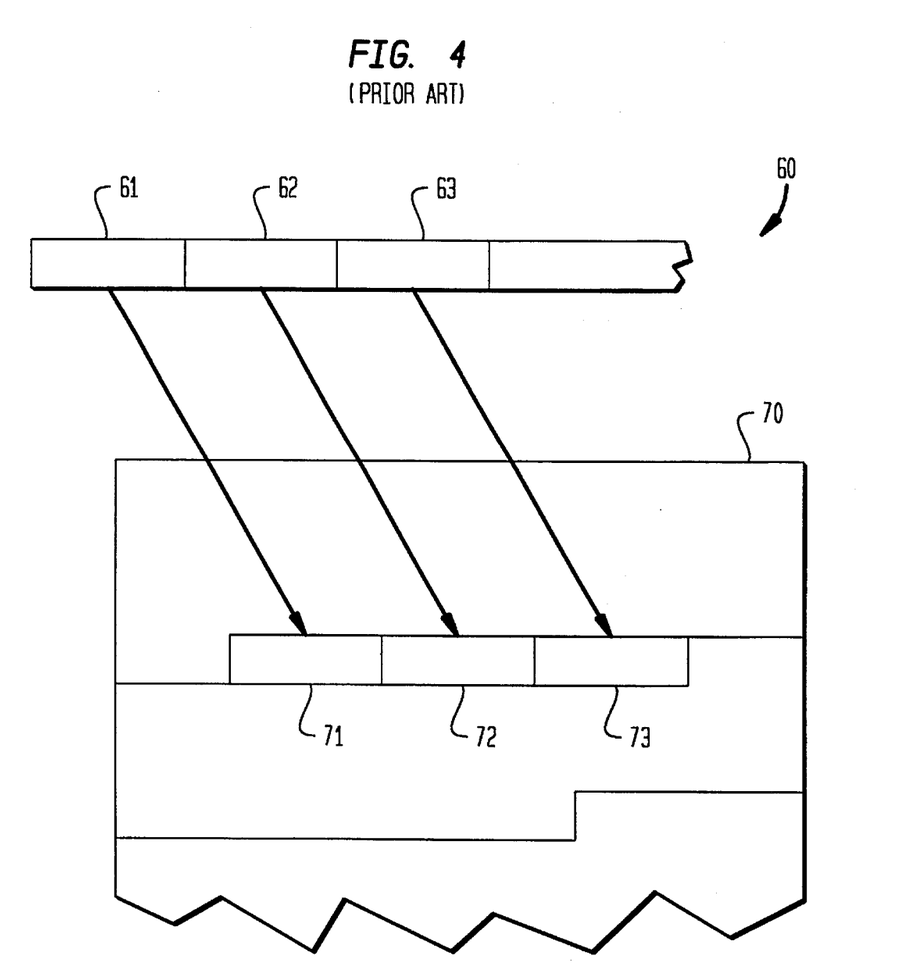
FIG. 4 illustrates an exemplary transfer of a data block from an I/O device to the main memory of a computer.

FIG. 4 shows a typical block or sequence of data words 60 to be transferred to a main memory 70 from, for example, a hard disk I/O device. As shown, the first data word 61 in the block is transferred to an initial addressed location 71 in the main memory 70. Each successive data word 62, 63, etc., is sequentially transferred to each succeeding (or preceding) addressed location 72, 73, etc., from the initial address location 71. Thus, unlike the CPU, the I/O device transfers data in a non-localized manner. Rather, each addressed location 71–73 is accessed once sequentially. Furthermore, the accessed addressed locations are highly predictable—the I/O device will access each addressed location from the initial address 71 to the initial address 71 plus (or minus) the number of data words to be transferred into the main memory 70.

The I/O bridge may not know the initial destination address of the data block, the size of the data block, nor whether the data are to be stored in ascending or descending order prior to transferring in the data from the I/O device. Rather, the I/O bridge is illustratively informed, via data transfer commands issued by the I/O device, of the destination address of the data words in the data block.

Figure 5:
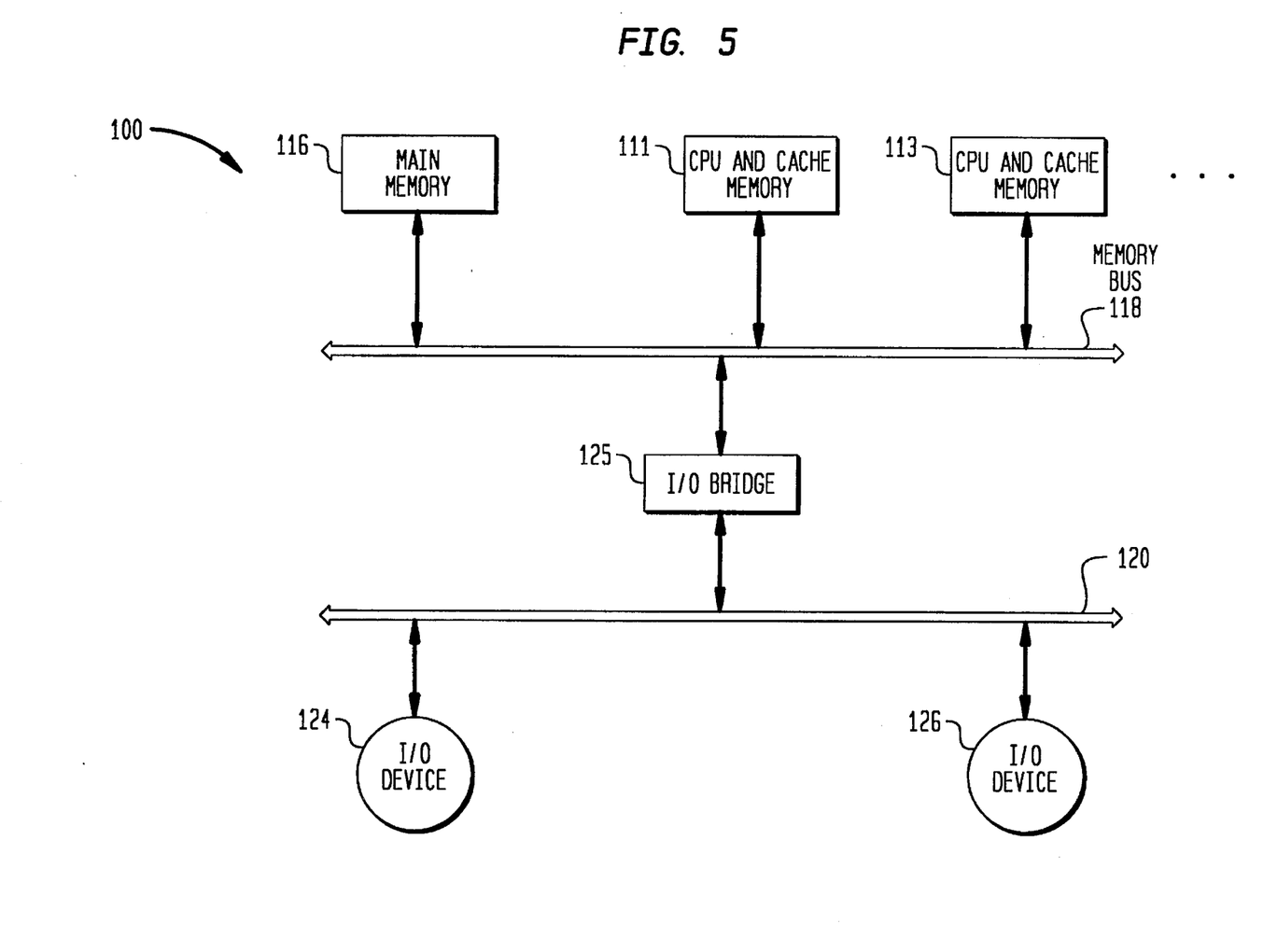
FIG. 5 depicts a computer system according to the present invention.

The present invention utilizes the predictability of I/O device accesses to reduce the latency in writing data from an I/O device to the main memory. Referring now to FIG. 5, a computer system 100 according to one embodiment of the present invention is depicted. The computer system 100 has a memory bus 118, a main memory 116 and one or more CPU's and associated cache memories 111, 113. For purposes of clarity, each CPU and its associated cache memory 111 or 113 is shown as a single unit although they can be embodied in separate circuits. The computer system 100 also has an I/O bus 120, one or more I/O devices 124, 126 and an I/O bridge 125 according to the present invention. The inventive I/O bridge 125 is capable of transferring data from an I/O device 124 or 126 to particular addresses in the main memory 116 with a high average transfer rate.

Figure 6:
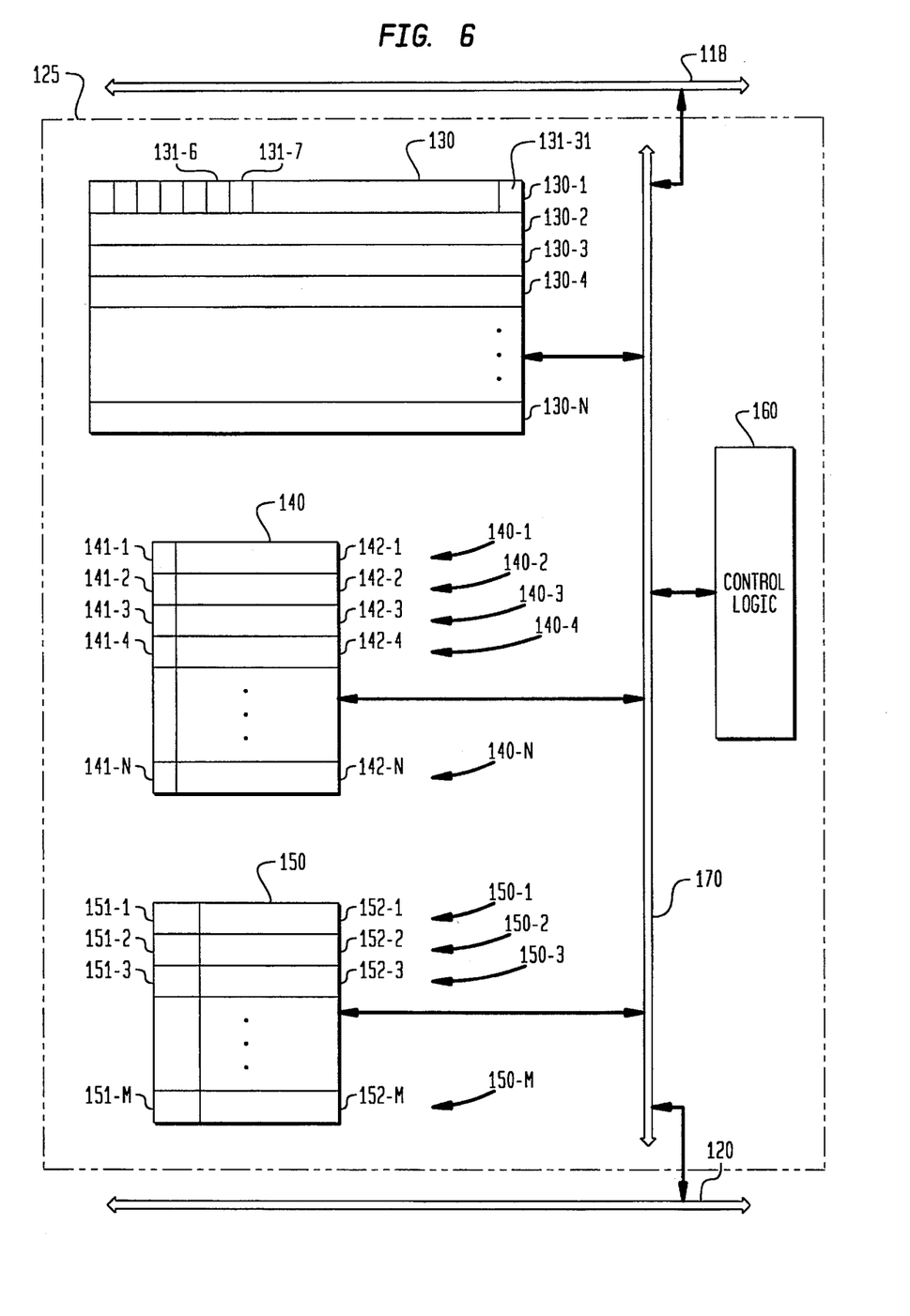
FIG. 6 depicts the inventive I/O bridge of FIG. 5 in greater detail.

Referring now to FIG. 6, the I/O bridge 125 is depicted in greater detail. As shown, the I/O bridge 125 has a buffer memory 130, a buffer tag array 140, a pre-own tag array 150 and control logic 160 connected to an internal bus 170. The buffer tag array 140 can be formed by a plurality of registers. Similarly, the pre-own tag array 150 can also be formed by a plurality of registers. Data and commands may be transmitted via the internal bus 170 under the control of the control logic 160. Furthermore, data flowing from the memory bus 118 to the I/O bus 120, or from the I/O bus to the memory bus 118, via the internal bus 170 of the I/O bridge can be temporarily stored in the buffer memory 130.

The control logic 160 may consist of intelligent digital finite state machines which carry out the functions described below. The buffer memory 130 illustratively has $N \geq 1$ storage spaces 130-1, 130-2, 130-3, 130-4, . . . , 130-N, which can each store a data line therein. Similarly, the buffer tag array 140 has an array element 140-1, 140-2, 140-3, 140-4, . . . , 140-N corresponding to each storage space 130-1, . . . , 130-N of the buffer memory 130 or N array elements 140-1, . . . , 140-N. Each buffer tag array element has a status field 141-1, 141-2, 141-3, 141-4, . . . , 141-N and a line address field 142-1, 142-2, 142-3, 142-4, . . . , 142-N. The purpose of these fields 141-1, . . . , 141-N and 142-1, . . . , 142-N is described below.

The pre-own tag array 150 has $M \geq 1$ array elements 150-1, 150-2, 150-3, . . . , 150-M each of which has a corresponding status field 151-1, 151-2, 151-3, . . . , 151-M and a line address field 152-1, 152-2, 152-3, . . . , 152-M. The number of pre-own tag array elements M can, but need not, equal the number of buffer tag array elements N. The purpose of the fields 151-1, . . . , 151-M and 152-1, . . . , 152-M of the pre-own tag array elements 150-1, ..., 150-M is described below.

Referring to FIGS. 5 and 6, the operation of the I/O bridge 125 is now described by way of example. Initially, the status fields 141-1, ..., 141-N of the buffer tag array 140 store an invalid status indication. Similarly, the status fields 151-1, ..., 151-M of the pre-own tag array 150 also initially store an invalid status. Suppose the I/O device 124 has a block, i.e., a sequence, of 256 bytes to store in the main memory 116 at the addresses in ascending order from the address 1029. The sequence of data words to be transferred from the I/O device 124 includes one or more contiguous subsequences of data words. The data words of each subsequence of data words are destined to main memory address locations in which the data words of only one data line of the main memory 116 are stored. For example, assume that each data line is thirty two bytes long. The data words destined to the main memory addresses 1029-1055 form a first subsequence corresponding to the data line having the line address 32 (which data line includes the data words stored at memory addresses 1024-1055). Similarly, the data words destined to the main memory addresses 1056-1087 form a second subsequence corresponding to the data line having the line address 33 (which includes the data words stored in the main memory 116 at addresses 1056-1087).

The I/O device 124 transmits a sequence of commands to the I/O bridge 125 via the I/O bus 120 indicating that it desires to transfer a block of 256 bytes to the sequence of addresses in the main memory starting at the initial address 1029. This sequence of commands is received by the control logic 160. First, the control logic 160 identifies the line address of the data line that includes a data word stored in the main memory 116 at the initial address 1029 to which the first data word of the first subsequence of data words is destined. Illustratively, the initial address 1029 is contained in the first data transfer command issued by the I/O device 124. In the case that each data line is thirty two bytes long, the line address of the corresponding data line in which ownership must be claimed may be determined by simply truncating the last five bits of the initial address (e.g., the data line stored at the line address 32 contains a data word stored at the address 1029). The control logic 160 then attempts to claim ownership in this data line. To that end, the control logic 160 gains control of the memory bus 118 pursuant to the bus arbitration protocol of the computer system 100 and issues a command for claiming ownership in the data line via the bus 118.

When the control logic 160 successfully claims ownership of the data line, the control logic 160 causes the I/O bridge 125 to receive the first subsequence of data words destined to main memory addresses occupied by the data words of this data line. As the first subsequence of data words is received, the control logic 160 examines the main memory destination addresses contained in consecutive data transfer commands issued by the I/O device 124. For example, suppose in the above example, data words are transferred from the I/O device 124 to the I/O bridge 125 in four byte groups. In this example, the I/O device 124 illustratively issues a sequence of commands including a first command for transferring a four byte group to the address 1029, a second command for transferring a four byte group to the address 1033, a third command for transferring a four byte group to the address 1037, etc. Based on these destination addresses, the control logic determines whether the data words are destined to addresses sequentially following (in the case the destination addresses contained in consecutive commands are increasing) or addresses sequentially preceding (in the case the destination addresses contained in the consecutive commands are decreasing) the initial address. Using this information, the control logic determines whether the data lines corresponding to the next subsequences of data words to be transferred from the I/O device 124 correspond to data lines which immediately follow or immediately precede the currently owned data line corresponding to the first subsequence of data words. In the above example, the sequence of data transfer commands issued by the I/O device 124 contains successively increasing addresses and thus subsequent subsequences of data words to be transferred from the I/O device 124 correspond to data lines which immediately follow the currently owned data line.

The control logic 160 can now claim ownership in one or more of the very next data lines (i.e., the data lines stored at line addressees 33, 34, etc.) which immediately precede or immediately follow (in this case, immediately follow) the currently owned data line (i.e., having the line address 32) while the first subsequence of data words (i.e., destined to the main memory addresses 1029-1055) is still being received. To that end, the control logic 160 first gains control of the memory bus 118 pursuant to the bus arbitration protocol of the computer system 100. Thereafter, the control logic 160 can issue a sequence of one or more ownership claiming commands for claiming ownership in one or more of the next data lines. The cache memories 111 and 113 snoop the bus 118 for such ownership claiming commands issued by the I/O bridge 125. If the cache memories currently contain an unmodified copy of one or more of these data lines therein, they will relinquish ownership of the data lines immediately. Alternatively, if the cache memory 111 or 113 has modified one of the data lines, the cache memory 111 or 113 will issue an intervention (delay) command to the I/O bridge 125 so that the cache memory 111 or 113 can first write back the modified data line to the main memory 116. After the cache memory 111 or 113 writes back a modified data line, the control logic 160 can successfully obtain ownership therein.

Figure 7:
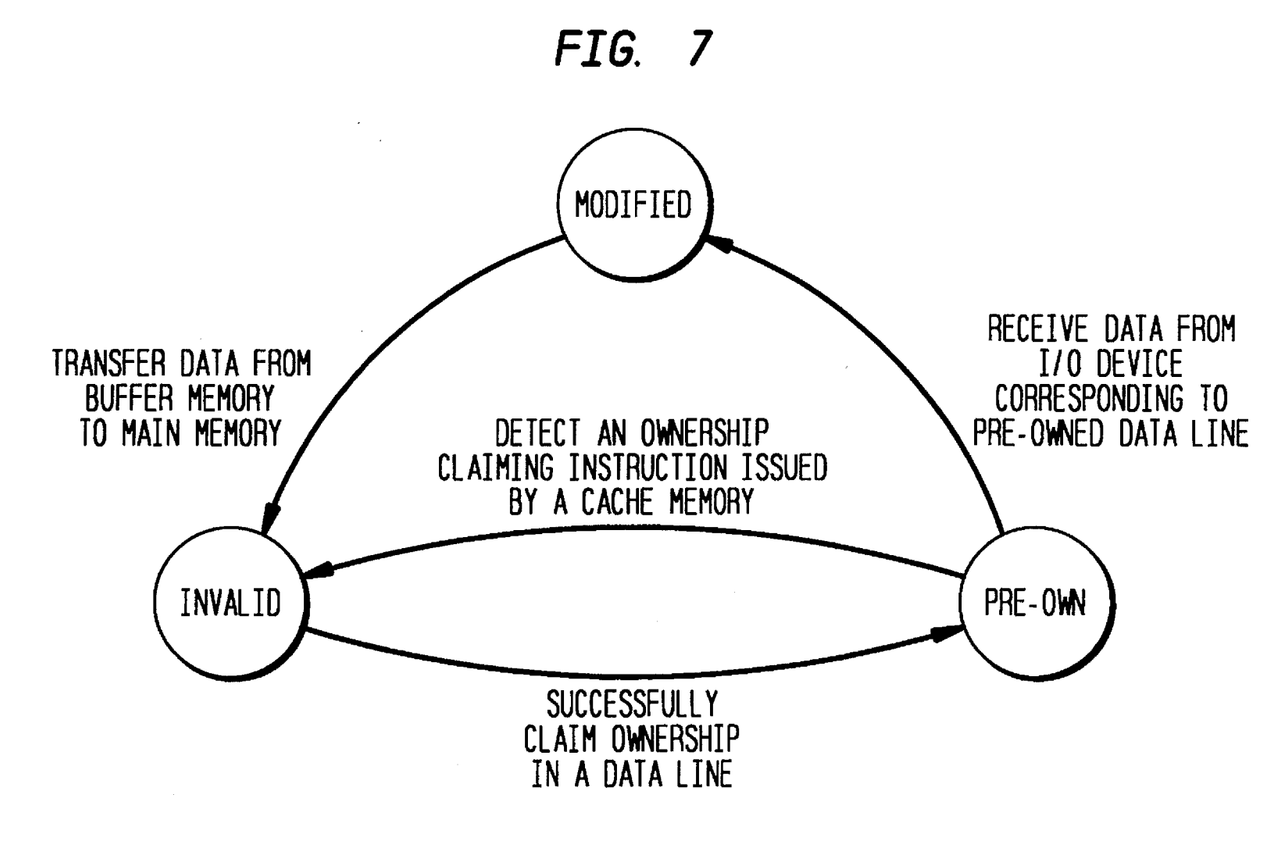
FIG. 7 depicts the status transition diagram of the inventive I/O bridge.

The control logic 160 monitors the memory bus 118 after it attempts to claim ownership in a data line. The control logic 160 can determine in which data lines ownership has been successfully claimed, if any, depending upon the elapsed time from the ownership claiming commands and the response, if any, issued by the cache memories 111 and 113. When the control logic 160 determines that it has successfully claimed ownership in a particular data line, the control logic 160 stores the data line's line address in the line address field (e.g., the line address field 152-1) of an available pre-own tag array element (e.g., the element 150-1). Illustratively, all tag array elements having an invalid indication stored in their corresponding status field (e.g., the status field 151-1) are available for use by the control logic 160. In addition to storing the line address of the data line in the pre-own tag array element (e.g., the element 150-1), the control logic 160 stores a pre-own status indication in the corresponding status field (e.g., the status field 151-1) of the pre-own tag array element. FIG. 7 shows a state diagram illustrating, among other things, this change in pre-own status indication.

As mentioned above, the control logic 160 receives the data words from the I/O device 124 via the I/O bus 120 for storage in the buffer memory 130 (which may occur simultaneously while claiming ownership in data lines). The data is transferred in sequential order from the data to be stored in the initial address to the data to be stored at the end address, i.e., in the order 1029, 1030, ..., 1285. Illustratively, the data is transferred over the I/O bus 120 in groups of four data bytes. However, the control logic delays receiving a group of data words until the control logic 160 has successfully claimed ownership in the corresponding data lines having at least one data word stored in the main memory at the addresses to which this group of data words is destined.

As mentioned before, the sequence of data words to be transferred from the I/O device 124 includes one or more contiguous subsequences of data words destined to the address locations occupied by the data words of only one data line of the main memory 116. Initially, the control logic 160 consults the pre-own tag array 150 prior to receiving the first data word of each subsequence to determine if the control logic 160 has successfully claimed ownership in the corresponding data line. Such is the case if the control logic 160 determines that one of the pre-own tag array elements (e.g., 150-1) storing a pre-own status indication (e.g., in the status field 151-1) also stores the line address of the corresponding data line (e.g., in the line address field 152-1).

Assume that the pre-own tag array element 150-1 stores a pre-own status in the status field 151-1 and the line address 33 in the line address field 152-1. The subsequence of data words destined to the main memory addresses 1056, 1057, . . . , 1057 may then be received. Illustratively, as the first data word (destined to the address 1056) of this subsequence is received, the control logic 160 stores an invalid status indication in the status field 151-1 of the pre-own tag array element 150-1.

In addition, the control logic 160 allocates a data line storage location, e.g., the location 130-2, of the buffer memory 130 for each subsequence of data words. For example, the storage location 130-2 is allocated to the data line having the line address 33 because the received subsequence of data words is to be stored at the addresses 1056–1087 and this data line has data words stored at the addresses 1056–1087. The control logic 160 does this by copying the line address in the line address field 152-1 of the pre-own tag array element 150-1 to the line address field, e.g., the field 142-2, of an available buffer tag array element, e.g., the element 140-2. Illustratively, all buffer tag array elements 140-1, . . . , 140-N which store an invalid status indication in their corresponding status storage field 141-1, . . . , 141-N are available for use by the control logic 160. In addition, the control logic 160 illustratively stores a modified status indication in the corresponding status field 141-2 of the buffer tag array element 140-2 as the first data word of the subsequence is stored in the associated buffer memory storage location 130-2. This is illustrated in the state diagram of FIG. 7.

As data words of a subsequence are received from the I/O device 124, the control logic 160 stores each received data word in its appropriate location in a data line storage location of the buffer memory 130. For example, suppose the data line having the line address 32 includes data words stored in the main memory at addresses 1029–1055. Furthermore, suppose the I/O device 124 transfers the four bytes ultimately destined to addresses 1029, 1030, 1031 and 1032 of the main memory 116 to the I/O bridge 125. The control logic 160 stores the data words intended for storage at the address 1029 in the sixth word location 131-6, the data word intended for storage in at the address 1030 in the seventh location 131-7, etc., of the storage space 131.

Once a data line storage space of the buffer memory 130 is allocated and ownership gained by I/O bridge, the I/O device 124 can freely transfer the data words of the subsequence to the I/O bridge 125. For example, with the buffer storage space 131 allocated to the data line having the line address 32, the four byte groups destined to the addresses, 1033–1036, 1037–1040, . . . , 1049–1052 may be freely received and stored in their appropriate locations in the storage space 131. However, the data group ultimately destined to the addresses 1053–1056 of the main memory 16 includes a data word of another subsequence, i.e., the data word destined to the address 1056. Thus, before the control logic 160 can receive this group, the control logic must determine if the data line having the line address 33 is currently owned by the I/O bridge 125 and must allocate a storage space in the buffer memory 131 as described above.

Illustratively, after the last data word of a subsequence is stored in the last data word location of a data line storage location, the control logic 160 can write this data to its appropriate location in the main memory 116. For example, the data destined to locations 1029–1055 are sequentially received from the I/O device and stored in their respective locations 131-6 to 131-31 of the data line storage location 131. After the data destined to the location 1055 is stored in the location 131-31, the control logic 160 then transfers this data to the addresses 1029–1055 of the main memory 116. As shown in the state diagram of FIG. 7, after writing back a data line stored in a data line storage location 130-1 of the buffer memory 130, the control logic changes the indication stored in the corresponding buffer tag array 140-1 to invalid.

Occasionally, after the control logic successfully claims ownership in a data line, a cache memory 111 or 113 may attempt to regain ownership of this data line. Thus, the control logic 160 must snoop the memory bus 118 for commands claiming ownership in data lines currently owned by the I/O bridge 125. In other words, whenever the control logic detects a command claiming ownership in a data line having a particular line address, the control logic 160 consults the pre-own tag array 150. The control logic 160 determines if any pre-own tag array element 150-1, . . . , 150-M stores a pre-own status in its corresponding status field 151-1, . . . , 151-M and the particular line address of the ownership claim command in its corresponding line address field 152-1, . . . , 152-M. If so, then the I/O bridge 125 owns this data line but has not yet received any data words of the corresponding subsequence from the I/O device 124. If such is the case, the control logic 160 simply releases ownership of the data line. For example, suppose that the control logic 160 detects a command claiming ownership in a particular data line. Furthermore, suppose a pre-own tag array element 150-3 stores the same particular line address in its line address field 152-3 and a pre-own status in its status field 151-3. The control logic 160 would store an invalid status indication in the status field 151-3. This is illustrated in FIG. 7. Thereafter, the control logic 160 may attempt to regain ownership of this data line by issuing an ownership claiming command via the memory bus 118.

It is also possible that the I/O bridge 125 owns the data line which is the subject of the ownership claim by the cache memory 111 or 113 and that the I/O device 124 has transferred some or all of the data words of the corresponding subsequence to the I/O bridge 125. Thus, if the control logic determines that no pre-own tag array element stores both the line address of the data line and a pre-own status indication, the control logic 160 then consults the buffer tag array 140. The control logic 160 determines if any buffer tag array element 140-1, . . . , 140-N therein stores both a modified status in its corresponding status field 141-1, . . . , 141-N and the particular line address of the claimed data line in its corresponding line address field 142-1, . . . , 142-N. If such is the case, the control logic 160 transmits an intervention (delay) command to the cache memory 111 or 113 via the memory bus 118. The control logic 160 then waits until the I/O device 124 sends any remaining data words of the current I/O command. Thereafter, the control logic 160 writes the data words to the main memory 116 via the memory bus 118. Thereafter, the cache memory 111 or 113 can obtain ownership in the data line.

Figure 8:
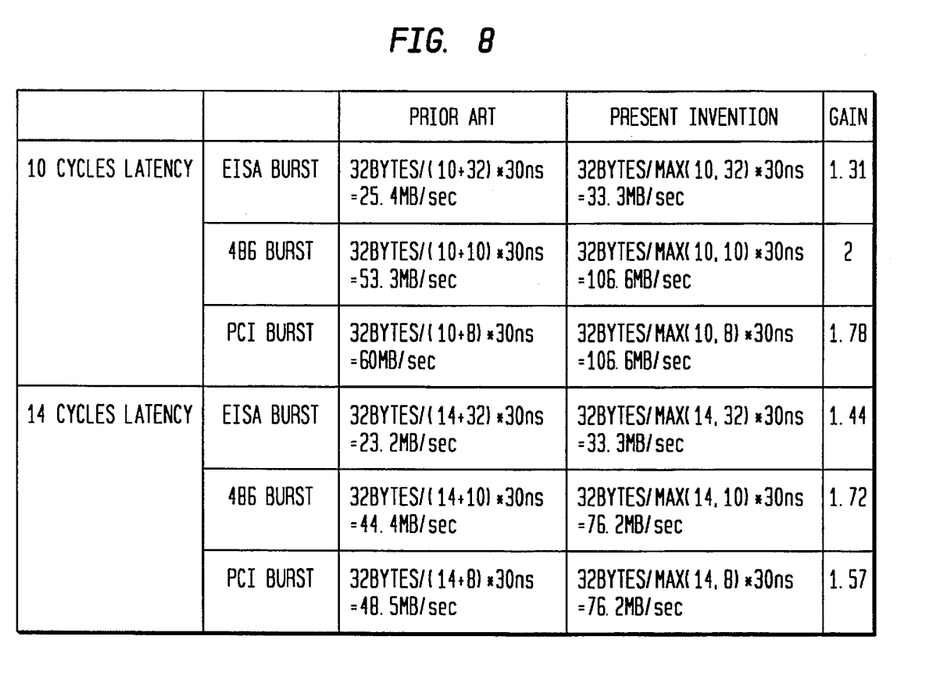
FIG. 8 depicts a chart comparing the performance of the present invention to the prior art.

In short, the present invention provides an I/O bridge 125 which simultaneously receives data corresponding to a currently owned data line and pre-issues one or more ownership claims in the very next data lines immediately preceding or immediately following the current data line. Thus, the I/O data transfer latency is greatly reduced. FIG. 8 compares the data transfer rate of the present invention to the prior art assuming either a ten cycle ownership claiming latency (best case) or a fourteen cycle ownership claiming latency (average case). The performance evaluation is for an XMP computer system (having a memory bus 116 cycle of 33 MHz) using the EISA, 80486 or PCI as its I/O bus transfer protocols.

Finally, the invention has been described above with reference to specific embodiments. Numerous other embodiments may be devised by those having ordinary skill in the art without departing from the spirit and scope of the following claims.

We claim:

1. In a computer system, an I/O bridge for transferring a sequence of data words from an I/O device to sequential addresses in a main memory which is organized into contiguous data lines, each data line having a unique line address and a fixed number of data words, said sequence of data words including one or more contiguous subsequences of data words, said one or more subsequences of data words each containing data words destined for a subsequence of addresses in said main memory, at which data words contained in only one data line are stored, said I/O bridge comprising:

control logic which, while receiving a first subsequence of data words destined for contiguous addresses in which data words of a first data line currently owned by said I/O bridge are stored, but prior to receiving a command from said I/O device to transfer a second subsequence of data words, attempts to claim ownership of one or more successive data lines next to said first data line, at least one of said one or more successive data lines including subsequences of data words stored at subsequences of addresses for which said second subsequence of data words, to be transferred from said I/O device after said received subsequence of data words, are destined; and a buffer memory including a plurality of data line storage locations, each data line storage location for storing one of said one or more subsequences of said sequence of data words received from said I/O device.

2. The I/O bridge of claim 1 further comprising an array of pre-own tag array elements, each pre-own tag array element for storing a line address of said main memory and a pre-own or invalid status indication, wherein in response to successfully claiming ownership in one of said one or more successive data lines, said control logic stores the line address of said successive data line and a pre-own status indication in one of said pre-own tag array elements.

3. The I/O bridge of claim 2 wherein said control logic delays receiving said second subsequence of data words from said I/O device until a pre-own tag array element stores a pre-own status indication and the line address of said successive data line having a data word stored in said main memory at each of said subsequence of addresses to which said second subsequence of data words is destined.

4. The method of claim 3 wherein in response to receiving a first data word of said second subsequence of data words from said I/O device, said control logic stores an invalid status indication in said pre-own tag array element containing said line address of said successive data line having a data word stored in said main memory at each address of said subsequence of addresses to which said second subsequence of data words is destined.

5. The I/O bridge of claim 2 wherein said computer system includes at least one cache memory, wherein, in response to detecting a command issued by said at least one cache memory claiming ownership in a data line owned by said I/O bridge, said control logic stores an invalid status indication in the pre-own tag array element corresponding to said data line in which said detected command claims ownership.

6. The I/O bridge of claim 1 further comprising an array of buffer tag array elements which each correspond to one data line storage location in said buffer memory, each buffer tag array element for storing a line address in said main memory and a modified or invalid status indication, wherein, in response to storing a first data word of said second subsequence of data words received from said I/O device in a data line storage location of said buffer memory, said control logic stores in a corresponding buffer tag array element a modified status indication and the line address of a data line having a data word stored in said main memory at each address of said subsequence of addresses to which said second subsequence of data words is destined.

7. The I/O bridge of claim 6 wherein said control logic transfers each subsequence of data words from said data line storage location of said buffer memory to said subsequence of addresses in said main memory.

8. The I/O bridge of claim 7 wherein said control logic stores in said corresponding buffer tag array element an invalid status indication after said control logic transfers the last data word of each subsequence of data words from said data line storage location of said buffer memory to said main memory.

9. In a computer system, a method for transferring a sequence of data words from an I/O device via an I/O bridge to sequential address in a main memory which is organized into contiguous data lines, each data line having a fixed number of data words and a unique line address, said sequence of data words including one or more contiguous subsequences of data words, said subsequences of data words each containing data words destined for a subsequence of addresses in said main memory at which data words contained in only one data line are stored, said I/O bridge comprising:

at control logic in said I/O bridge, while said I/O bridge receives data of a first subsequence of data words destined for addresses in which data of a first data line currently owned by said I/O bridge are stored, but prior to receiving a command from said I/O device to transfer a second subsequence of data words, attempting to claim ownership of one or more successive data lines next to said first data line in said main memory, at least one of said one or more successive data lines including data words stored at subsequences of addresses for which said second subsequence of data words, to be transferred from said I/O device after said received subsequence of data words, are destined, and storing, in a data line storage location of a buffer memory in said I/O bridge, one of said subsequences of said sequence of data words received form said I/O device.

10. The method of claim 9 further comprising the step of, in response to successfully claiming ownership in one of said one or more successive data lines, storing the line address of said successive data line and a pre-own status indication in a pre-own tag array element of a pre-own tag array of said I/O bridge.

11. The I/O bridge of claim 10 further comprising the step of delaying the receipt of said second subsequence of data words from said I/O device until a pre-own tag array element stores a pre-own status indication and the line address of said successive data line having a word stored in said main memory at each of said addresses of said subsequence of sequential addresses to which said second subsequence of data words is destined.

12. The method of claim 10 further comprising the step of, in response to receiving a first data word of said second subsequence of data words from said I/O device, storing an invalid status indication in said pre-own tag array element containing said line address of said successive data line having a data word stored in said main memory at each address of said subsequence of addresses to which said second subsequence of data words is destined.

13. The method of claim 10 further comprising the step of, in response to detecting a command issued by a cache memory claiming ownership in a data line owned by said I/O bridge, storing an invalid status indication in the pre-own tag array element corresponding to said data line in which said detected command claims ownership.

14. The method of claim 9 further comprising the step of, in response to storing a first data word of said second subsequence of data words received from said I/O device in a data line storage location of said buffer memory, storing in a corresponding buffer tag array element of a buffer tag array of said I/O bridge a modified status indication and the line address of a data line having a data word stored in said main memory at each address of said subsequence of addresses to which said second subsequence of received data words is destined.

15. The method of claim 14 further comprising the step of transferring each subsequence of data words from said data line storage location of said buffer memory to said subsequence of sequential addresses in said main memory.

16. The method of claim 15 further comprising the step of storing in said corresponding buffer tag array element an invalid status indication after said control logic transfers the last data word of each subsequence of data words from said data line storage location of said buffer memory to said main memory.

17. A computer system comprising:

a first bus, a main memory connected to said first bus for storing data words at addresses, said main memory being organized into contiguous data lines, each data line having a fixed number of data words and a unique line address, at least one CPU and associated cache memory connected to said first bus for accessing said lines of data in said main memory via said first bus, a second bus, an I/O device connected to said second bus, and an I/O bridge connected to said main memory via said first bus and to said I/O device via said second bus for transferring a sequence of data words from an I/O device to sequential addresses in said main memory, said sequence of data words including one or more contiguous subsequences of data words, said subsequences of data words each containing data words destined for a subsequence of addresses in said main memory, at which data words contained in only one data line are stored, said I/O bridge comprising:

control logic which, while receiving data words of a first subsequence destined for contiguous addresses in which data words of only a first data line currently owned by said I/O bridge are stored, but prior to receiving a command from said I/O device to transfer a second subsequence of data words, attempts to claim ownership of one or more successive data lines next to said first data line, at least one of said one or more data lines including data words stored at subsequences of addresses for which said second subsequences of data words, to be transferred from said I/O device after said received subsequence of data words, are destined; and a buffer memory including a plurality of data line storage locations, each data line storage location for storing a subsequence of said sequence of data words received from said I/O device.

* * * * *